United States Patent
Futamura et al.

(10) Patent No.: US 8,388,771 B2
(45) Date of Patent: Mar. 5, 2013

(54) HIGH STRENGTH STEEL SHEET HAVING EXCELLENT FORMABILITY

(75) Inventors: Yuichi Futamura, Kakogawa (JP); Katsuhiro Yamamoto, Kakogawa (JP); Masaaki Miura, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/225,920

(22) Filed: Sep. 6, 2011

(65) Prior Publication Data
US 2011/0318605 A1  Dec. 29, 2011

Related U.S. Application Data

(63) Continuation of application No. 11/627,192, filed on Jan. 25, 2007, now abandoned.

(30) Foreign Application Priority Data

Feb. 23, 2006  (JP) ................................. 2006-046633

(51) Int. Cl.
- C22C 38/02 (2006.01)
- C22C 38/04 (2006.01)
- C22C 38/22 (2006.01)
- C22C 38/06 (2006.01)
- C22C 38/28 (2006.01)
- C22C 38/26 (2006.01)
- C22C 38/24 (2006.01)

(52) U.S. Cl. ........ 148/330; 148/332; 148/334; 148/337; 420/103; 420/110; 420/111

(58) Field of Classification Search .................. 143/330, 143/332, 334, 337; 148/330, 332, 334, 337
See application file for complete search history.

(56) References Cited

U.S. PATENT DOCUMENTS

| | | | |
|---|---|---|---|
| 7,371,294 B2 * | 5/2008 | Miura et al. | 148/333 |
| 2003/0111144 A1 * | 6/2003 | Matsuoka et al. | 148/603 |
| 2004/0108024 A1 * | 6/2004 | Matsuoka et al. | 148/602 |
| 2005/0167007 A1 | 8/2005 | Miura et al. | |

FOREIGN PATENT DOCUMENTS

| | | |
|---|---|---|
| JP | 2000-355735 | 12/2000 |
| JP | 2002-226943 | 8/2002 |
| JP | 2002-363650 | 12/2002 |
| JP | 2003-3240 | 1/2003 |
| JP | 2003105444 * | 4/2003 |
| JP | 2005-213640 | 8/2005 |

OTHER PUBLICATIONS

Machine translation of JP 2003-105444 A, published Apr. 2003.*
Japanese Office Action issued Jan. 31, 2012 in patent application No. 2007-042868 with English translation.

* cited by examiner

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

A high strength steel sheet contains, in percent by mass, 0.03 to 0.2% of C, 0.5 to 2.5% of Si, 1 to 3.0% of Mn, 0.01 to 0.5% of Cr, 0.01 to 0.5% of Mo, 0.02 to 0.15% of Al, 0.15% or less of Ti, 0.15% or less of No, and 0.15% or less of V; wherein the remainder includes Fe and inevitable impurities, and the content of Si satisfies the following formula (1), $$\alpha - 4.1 \leq [Si] \alpha - 2.4 \qquad (1),$$

provided,
$\alpha = 6.9 \times ([C] + [Mn]/6 + [Cr]/5 + [Mo]/4 + [Ti]/15 + [Nb]/17 + [V]/14)^{1/2}$ is given, wherein [ ] shows the quantity (mass percent) of each element contained in the steel sheet. The high strength steel sheet is improved in formability (particularly, elongation), and excellent in balance between strength and elongation.

8 Claims, 1 Drawing Sheet

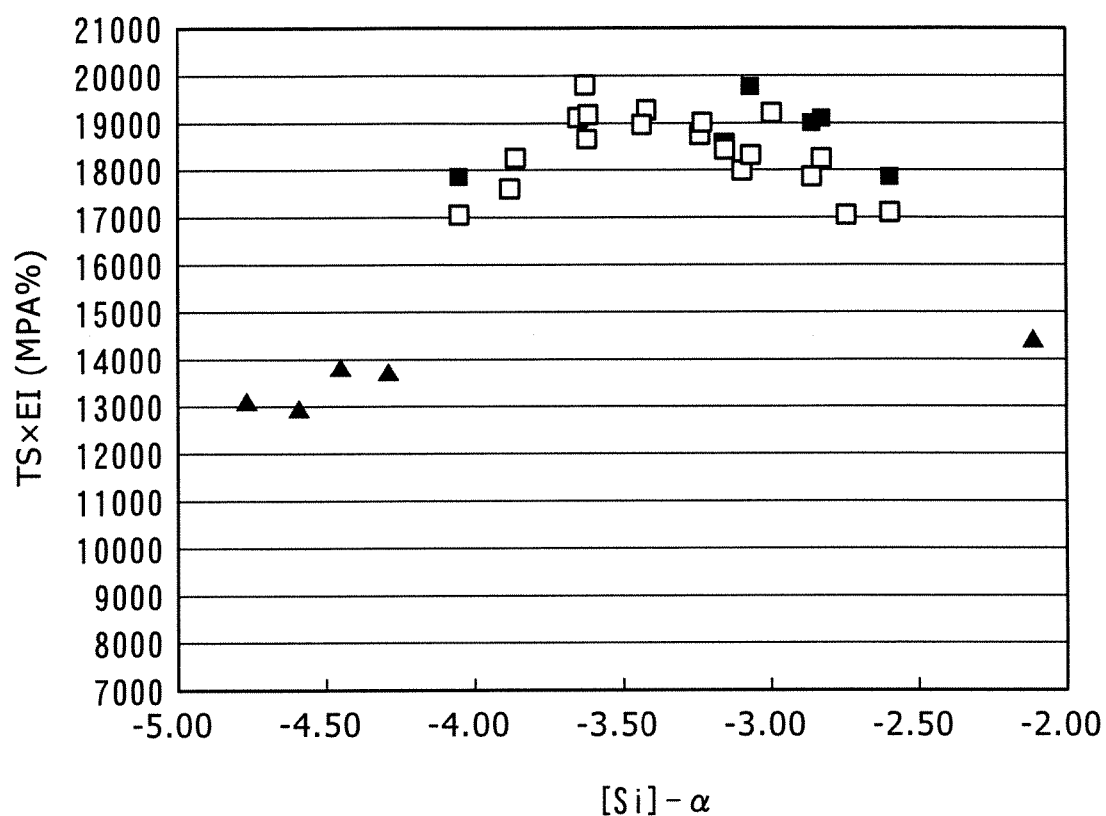

HIGH STRENGTH STEEL SHEET HAVING EXCELLENT FORMABILITY

This application is a continuation of U.S. application Ser. No. 11/627,192 (filed Jan. 25, 2007; now abandoned) and claims priority to JP 2006-046633 (filed Feb. 23, 2006).

BACKGROUND OF THE INVENTION

1. Field of the Invention

The present invention relates to a high strength steel sheet, and particularly relates to a high strength steel sheet to be a parent material (raw material) of a high strength galvanized steel sheet or a high strength alloyed, galvanized steel sheets.

2. Description of Related Art

A structural member such as member or pillar that operates to absorb energy of crash as a framework member of automobile is required to have high strength in the light of improving safety, or achieving lightweight of the body for improving fuel consumption as a measure of environmental issues. The structural member is further required to have an improved rust prevention property, and a high strength galvanized steel sheets formed by galvanizing a surface of a high strength steel sheet, or a high strength alloyed, galvanized steel sheet formed by being subjected to such galvanization and then alloying, is used as the structural member.

A raw material of such a structural member is required to have formability (elongation) to be formed into a desired shape of a structural member, in addition to the high strength and the rust prevention property. However, since increase in strength of a steel sheet induces reduction in formability, the material is required to balance strength and formability (improvement in balance between strength and elongation).

As a technique for improving formability when a galvanized steel sheet is increased in strength, JP-B-62-40405 describes that a metal structure of a steel sheet can be a mixed structure including a second phase mainly including a ferrite matrix and martensite. However, since strength of the steel sheet disclosed in the literature is only about 600 MPa, further increase in strength is required.

On the other hand, JP-A-9-13147 describes a high tensile alloyed galvanized steel sheet having improved formability and strength of 800 MPa or more. The literature describes that 0.4% or more of Si is added to increase in strength of the steel sheet, in addition, obtain a dual phase structure of ferrite and martensite as a metal structure of a steel sheet. However, a relationship between Si and balance of strength with elongation is not noted, and therefore the balance between strength and elongation has been sometimes degraded.

SUMMARY OF THE INVENTION

In view of the foregoing, it is desirable to provide a high strength steel sheet having excellent balance between strength and elongation by improving formability (particularly, elongation) of the high strength steel sheet.

The inventors have made earnest study aiming to balance strength and formability (particularly, elongation) of a steel sheet. As a result, they found that it was enough that the Si content was increased and appropriately controlled depending on the quantity of other alloy elements, and consequently completed an embodiment of the invention.

That is, a high strength steel sheet according to an embodiment of the invention contains, in percent by mass, 0.03 to 0.2% of C, 0.5 to 2.5% of Si, 1 to 3.0% of Mn, 0.01 to 0.5% of Cr, 0.01 to 0.5% of Mo, 0.02 to 0.15% of Al, 0.15% or less of Ti, 0.15% or less of Nb, and 0.15% or less of V; wherein a metal structure includes ferrite and a second phase, a fraction of ferrite is 10% to 90%, a fraction of the second phase is 10% to 90%, and the content of Si satisfies the following formula (1), $$\alpha - 4.1 \leq [Si] \leq \alpha - 2.4 \tag{1},$$

provided, $\alpha = 6.9 \times ([C] + [Mn]/6 + [Cr]/5 + [Mo]/4 + [Ti]/15 + [Nb]/17 + [V]/14)^{1/2}$ is given, wherein [ ] shows the quantity (mass percent) of each element contained in the steel sheet.

A form of the formula for obtaining $\alpha$ and values of constants therein were statistically obtained based on experimental results.

In some combinations of content of elements, there may be a case that a range of the Si content obtained by the formula (1) does not overlap the range of 0.5 to 2.5% of Si. Such combinations of content of elements are without a scope of an embodiment of the invention, even if content of each element is within the above range without exception.

The high strength steel sheet of an embodiment of the invention may contain at least one selected from a group including 0.01 to 0.15% of Ti, 0.01 to 0.15% of Nb, and 0.01 to 0.15% of V.

The high strength steel sheet of an embodiment of the invention may contain 0.0005 to 0.01% of B, 0.0005 to 0.01% of Ca, 0.0005 to 0.5% of Cu, or 0.0005 to 0.5% of Ni.

A surface of the high strength steel sheet of an embodiment of the invention may have a galvanizing layer or an alloyed galvanizing layer formed thereon.

A metal structure of the high strength steel sheet includes a mixed structure of ferrite and a second phase, and an area ratio of an intermediate transformation structure in the second phase is preferably 0.3 or less.

According to an embodiment of the invention, a steel sheet can be improved in strength by increasing the Si content, in addition, can be improved in formability (particularly, elongation) by appropriately controlling the Si content depending on the content of other alloy elements.

BRIEF DESCRIPTION OF THE DRAWINGS

FIG. 1 shows a view showing a relationship between values of ([Si]−α) and TS×El.

DESCRIPTION OF THE PREFERRED EMBODIMENT

The high strength steel sheet of an embodiment of the invention contains 0.5 to 2.5% of Si. Si is an element that has large capability of solid solution strengthening, and operates to increase strength. When the Si content is increased, a fraction of ferrite is increased, and bainite transformation is suppressed in the second phase, consequently a martensite structure is easily obtained. Therefore, a metal structure of the steel sheet becomes a multi-phase structure of ferrite and martensite, consequently high strength and excellent elongation (formability) can be achieved. The Si content is 0.5% or more, preferably 0.6% or more, and more preferably 0.7% or more. However, when Si is excessively contained, scales of Si are produced in hot rolling, which degrades surface properties of the steel sheet, in addition, degrades conversion treatment properties of the steel sheet or adhesion of plate, resulting in occurrence of non-plating portions. Moreover, when Si is excessive, an austenite phase is hardly obtained in annealing, therefore a mixed structure of ferrite and martensite is hardly formed. Therefore, the Si content is 2.5% or less, preferably 2.3% or less, and more preferably 2.1% or less.

The high strength steel sheet of an embodiment of the invention contains 0.5 to 2.5% of Si, and it is important in an embodiment of the invention that the Si content is controlled depending on content of alloy elements influencing the second phase among all alloy elements other than Si. The inventors prepared various kinds of steel sheets having different chemical compositions, and continuously investigated a relationship between chemical compositions and mechanical properties (that is, balance between strength and elongation) of the steel sheets, as a result, they found that when balance between the Si content in steel and the content of alloy elements influencing the second phase was appropriately controlled, the mechanical properties of the steel sheets were able to be improved.

The second phase means a structure in combination of (a) martensite and (b) an intermediately-transformed structure (here, structures to be formed except for martensite and ferrite, for example, bainite or quasi-pearlite) of martensite and ferrite defined by Araki, et al, "Atlas for Bainitic Microstructures Vol. 1" (The Iron and Steel Institute of Japan, 1992, pp. 1-2).

The alloy elements influencing the second phase are C, Mn, Cr, Mo, Ti, Nb and V, and the Si content in steel needs to satisfy the following formula (1)

$$\alpha-4.1 \leq [Si] \leq \alpha-2.4 \quad (1)$$

provided,
$\alpha=6.9\times([C]+[Mn]/6+[Cr]/5+[Mo]/4+[Ti]/15+[Nb]/17+[V]/14)^{1/2}$ is given, wherein [ ] shows the quantity (mass percent) of each element contained in a steel sheet. In the following formula for obtaining $\alpha$, calculation is made assuming that the quantity of elements being not contained (elements in a level of inevitable impurities) is zero.

While the C, Mn, Cr and Mo are elements having an influence on formation of the second phase, when the Si content is low compared with the content of C, Mn, Cr and Mo, an effect of added Si is not exhibited, and on the other hand, when the Si content is high, the effect of added Si is saturated, and in each case, the mechanical properties (balance between strength and elongation) tend to be degraded.

While the Ti, Nb and V are elements that suppress formation of the intermediately-transformed structure and operate to form martensite in the second phase, when the Si content is low compared with the content of Ti, Nb and V, the effect of added Si is not exhibited, and on the other hand, when the Si content is high, the effect of added Si is saturated, and in each case, the mechanical properties (balance between strength and elongation) tend to be degraded.

Such phenomena are obvious from FIG. 1 shown in examples described later. FIG. 1 shows a relationship between values given by subtracting a value of $\alpha$ from values of the Si content in steel, and the mechanical properties (balance between strength and elongation). As obvious from the FIG. 1, when ([Si]−$\alpha$) is controlled within a range of −4.1 to −2.4, 17000 MPa % or more can be achieved.

The lower limit of the formula (1) is preferably expressed by the following formula (1a), and more preferably expressed by the following formula (1b). On the other hand, the upper limit of the formula (1) is preferably expressed by the following formula (1c), and more preferably expressed by the following formula (1d).

$$\alpha-4.0 \leq [Si] \quad (1a)$$

$$\alpha-3.65 \leq [Si] \quad (1b)$$

$$[Si] \leq \alpha-2.55 \quad (1c)$$

$$[Si] \leq \alpha-2.60 \quad (1d)$$

The steel sheet of an embodiment of the invention contains C, Mn, Cr, Mo and Al as essential elements within a range of satisfying the formula (1) is satisfied. An appropriate range of each element and a reason for limiting the range are as follows.

C: 0.03 to 0.2%

C is an element necessary for securing strength of 590 MPa or more. In addition, C is an element that influences formation or a mode of the second phase to improve elongation. Therefore, the C content is 0.03% or more, preferably 0.04% or more, and more preferably 0.05% or more. However, when C is excessive, weldability tends to be degraded. Therefore, the C content is 0.2% or less, preferably 0.18% or less, and more preferably 0.17% or less.

Mn: 1 to 3.0%

Mn is an element that stabilizes austenite in soaking, and changes quantity of dissolved C in austenite, so that influences strength of the second phase formed during cooling. In addition, Mn operates as a solution strengthening element, and strengthens ferrite. Therefore, the Mn content is 1% or more, preferably 1.4% or more, and more preferably 1.6% or more. However, when Mn is excessive, steel is hard to be ingoted, in addition, adverse influence is exerted on elongation or weldability. Therefore, the Mn content is 3.0% or less, preferably 2.7% or less, and more preferably 2.5% or less.

Cr: 0.01 to 0.5%

Cr is an element that improves hardenability of a steel sheet, and accelerates formation of martensite in the second phase, which effectively operates to increase strength of the steel sheet. Therefore, the Cr content is 0.01% or more, preferably 0.03% or more, and more preferably 0.05% or more. However, even if Cr is excessively contained, such effects are saturated, resulting in cost increase. Therefore, the Cr content is 0.5% or less, preferably 0.4% or less, and more preferably 0.35% or less.

Mo: 0.01 to 0.5%

Mo is an element that operates similarly as Cr as described before. Therefore, the Mo content is 0.01% or more, preferably 0.02% or more, and more preferably 0.03% or more. However, even if Mo is excessively contained, effects are saturated, resulting in cost increase. Therefore, the Mo content is 0.5% or less, preferably 0.45% or less, and more preferably 0.40% or less.

Al: 0.02 to 0.15%

Al is an element to be contained for deoxidization. Therefore, the Al content is 0.02% or more, preferably 0.04% or more, and more preferably 0.05% or more. However, when Al is excessive, quantity of oxide-based inclusions is increased, and surface properties of a steel sheet are degraded. Therefore, the Al content is 0.15% or less, preferably 0.13% or less, and more preferably 0.11% or less.

The remainder in the steel sheet of an embodiment of the invention includes Fe and inevitable impurities. As the inevitable impurities, for example, P, S, N, and tramp elements are given. Preferable ranges of the content of P, S and N are as follows.

When P is excessive, weldability tends to be degraded. Therefore, the P content is preferably 0.03% or less, more preferably 0.025% or less, and further more preferably 0.023% or less.

When S is excessive, sulfide-based inclusions are increased, and strength of a steel sheet tends to be reduced. Therefore, the S content is preferably 0.01% or less, more preferably 0.007% or less, and further more preferably 0.005% or less.

While N is an element that strengthens steel by precipitating nitrides in steel, when N is excessive, large quantity of nitrides are precipitated, which may rather induce reduction in elongation. Therefore, the N content is preferably 0.01% or less, more preferably 0.008% or less, and further more preferably 0.0070% or less.

The steel sheet of an embodiment of the invention may contain, in addition to the essential elements, (a) at least one element selected from a group including Ti, Nb and V, (b) B, (c) Ca, and (d) Cu and/or Ni as another element as necessary. In the case of containing such an element, a preferable range and a reason for limiting the range are as follows.

(a) At least one element selected from a group including 0.01 to 0.15% of Ti, 0.01 to 0.15% of Nb, and 0.01 to 0.15% of V.

All of Ti, Nb and V are elements that suppress formation of the intermediately-transformed structure.

In particular, Ti is an element that strengthens steel by forming precipitates such as carbides or nitrides in steel. Moreover, Ti effectively operates to increase yield strength by refining crystal grains. However, when Ti is excessively contained, large quantity of carbides precipitate in grain boundaries, resulting in reduction in local elongation. Therefore, the Ti content is 0.15% or less, preferably 0.13% or less, and more preferably 0.1% or less. The lower limit of the Ti content is not particularly limited, however, the Ti content is preferably 0.01% or more, more preferably 0.015% or more, and further more preferably 0.02% or more to allow such effects to be effectively exhibited. Ti further has an effect that it is dissolved in steel and suppresses formation of the intermediately-transformed structure during cooling, thereby improves balance between elongation and ductility of a steel sheet. Ti is preferably contained such that the following formula (3) is satisfied to allow such effects to be effectively exhibited. More preferably, the following formula (3a) is satisfied.

$$[Ti] > 3.43 \times [N] \quad (3)$$

$$[Ti] \geq 4 \times [N] \quad (3a)$$

provided, [ ] shows content of each element.

Nb and V, which are elements of refining crystal grains, increase strength without reducing toughness. As Ti as described above, the elements further have an effect that they are dissolved in steel and suppress formation of the intermediately-transformed structure during cooling, thereby improves balance between elongation and ductility of a steel sheet. However, even if they are excessively contained, such effects are saturated, resulting in cost increase. Therefore, the Nb content is 0.15% or less, preferably 0.13% or less, and more preferably 0.1% or less, and the V content is 0.15% or less, preferably 0.13% or less, and more preferably 0.1% or less. To allow such effects to be effectively exhibited, the Nb content is preferably 0.01% or more, more preferably 0.02% or more, and further more preferably 0.03% or more, and the V content is preferably 0.01% or more, more preferably 0.02% or more, and further more preferably 0.03% or more.

Ti, Nb and V may be independently contained, or may be contained in a multiply combined manner. When two kinds of elements are contained, the content of them is satisfactorily 0.3% or less in total, and when three kinds of elements are contained, the content of them is satisfactorily 0.45% or less in total.

(b) B: 0.0005 to 0.01%

B is an element of improving hardenability, which increases strength of a steel sheet. Moreover, B is contained together with Mo, thereby hardenability during accelerated cooling after rolling is controlled so that balance between strength and toughness of a steel sheet is optimized. However, B does not substantially influence formation of the intermediately-transformed structure, and therefore does not influence the optimum Si content. However, since excessive content of B causes deterioration in toughness of a steel sheet, B is preferably 0.01% or less. More preferably, it is 0.005% or less. To allow such effects to be efficiently exhibited, B is preferably 0.0005% or more.

(c) Ca: 0.0005 to 0.01%

Ca is an element of spherodizing a form of sulfides in steel to improve formability. However, even if Ca of more than 0.01% is contained, effects are saturated, which is economically wasteful. Therefore, the Ca content is preferably 0.01% or less, and more preferably 0.005% or less. To allow such effects to be efficiently exhibited, the Ca content is preferably 0.0005% or more.

(d) Cu: 0.0005 to 0.5% and/or Ni: 0.0005 to 0.5%

Either of Cu and Ni is a solution strengthening element which operates to increase strength of a steel sheet. Moreover, it is an element of improving corrosion resistance of a steel sheet. However, even if Cu of more than 0.5% and/or Ni of more than 0.5% are contained, effects are saturated, resulting in cost increase. Therefore, the Cu content is preferably 0.5% or less, more preferably 0.4% or less, and further more preferably 0.3% or less. The Ni content is preferably 0.5% or less, more preferably 0.4% or less, and furthermore preferably 0.3% or less. Cu and Ni may be contained independently or collectively. To allow such effects to be efficiently exhibited, the content of Cu or Ni is preferably 0.0005% or more. While Cu and Ni are elements of accelerating formation of martensite in the second phase, since effects are slight if each of Cu and Ni is within the above range, they do not influence the optimum Si content.

The steel sheet of an embodiment of the invention is characteristically specified in chemical composition, and for example, a surface of the steel sheet may have a galvanizing layer or an alloyed, galvanizing layer formed thereon.

A metal structure of the steel sheet can be formed by a mixed structure of ferrite and the second phase.

Each fraction (area percentage) of ferrite and the second phase in the metal structure is not particularly limited, and can be determined depending on balance between strength and elongation required for the steel sheet. That is, when a fraction of ferrite is increased, elongation tends to be increased while strength tends to be decreased; and when a fraction of the second phase is increased, elongation tends to be decreased while strength tends to be increased. Therefore, the fraction of ferrite is preferably 90% or less, more preferably 80% or less, and furthermore preferably 70% or less, and preferably 10% or more, more preferably 20% or more, and furthermore preferably 30% or more. The fraction of the second phase is preferably 90% or less, more preferably 80% or less, and further more preferably 70% or less, and preferably 10% or more, more preferably 20% or more, and further more preferably 30% or more.

The high strength steel sheet of an embodiment of the invention preferably has an area ratio of the intermediately-transformed structure in the second phase (area percentage of the intermediately-transformed structure/area percentage of the second phase, hereinafter, sometimes called $S_c$ value) of 0.3 or less. Since formation of the intermediately-transformed structure is suppressed, a hard martensite structure is increased, consequently formability (elongation) can be particularly increased. As a result, mechanical properties (balance between strength and elongation) can be remarkably improved. The $S_c$ value is more preferably 0.28 or less, and further more preferably 0.27 or less.

The metal structure of the steel sheet can be obtained by observing a central portion along thickness of the sheet at a magnification of ×3000 using a scanning electron microscope (SEM).

Since the high strength steel sheet of an embodiment of the invention is about 590 to 1270 MPa in tensile strength (TS), and excellent in balance between strength and elongation (TS×El is 16000 MPa % or more), it can be preferably used for a raw material of an automobile member that operates to absorb energy of crash as a framework member of automobile (for example, member or pillar).

The high strength steel sheet of an embodiment of the invention satisfies all requirements on the composition and the structure specified as above. While manufacturing conditions of the steel sheet are not particularly limited, for example, the following condition can be used.

A slab having the above component composition can be hot-rolled, and wound at 700° C. or less, then pickled as necessary, and then cold-rolled, and then soaked at a temperature of Ac1 point or more in an annealing line or a continuous galvanizing line, and then cooled at an average cooling rate of 1° C./sec or more.

While hot rolling can be performed according to a common procedure, heating temperature is satisfactorily set to be about 1000 to 1300° C. to secure finishing temperature and prevent coarsening of austenite grains. The finishing temperature of hot rolling is set to be 800 to 950° C. to prevent formation of a texture that inhibits formability, and an average cooling rate from temperature after finish rolling to temperature at winding start is satisfactorily set to be 30 to 120° C./sec to suppress formation of pearlite.

Winding temperature is preferably 700° C. or less. When it exceeds 700° C., thickness of scales formed on a surface of the steel sheet is increased, consequently pickling becomes worse. While the lower limit of the winding temperature is not particularly limited, when it is excessively low, the second phase is excessively formed, leading to excessive hardening of the steel sheet, and reduction in hot rolling performance. Therefore, the lower limit of the winding temperature is preferably 250° C., and more preferably 400° C.

After hot rolling, the steel sheet is pickled according to the common procedure as necessary, and then cold-rolled. A reduction rate is preferably 15% or more. To obtain the reduction rate of less than 15%, the steel sheet must be reduced in thickness in a hot rolling process, and when the steel sheet is reduced in thickness in the hot rolling process, the steel sheet is increased in length, therefore much time is required for pickling, leading to reduction in productivity.

After cold rolling, it is enough that the steel sheet is heated and held in a ferrite-austenite dual phase region or an austenite single phase region at the Ac1 point or more in a continuous annealing line or a continuous galvanizing line for soaking.

While the soaking temperature can be the Ac1 point or more, when it is intended that a metal structure during heating includes the mixed structure of ferrite and austenite, thereby martensite is securely formed to improve formability, soaking is preferably performed at a temperature about 50° C. higher than the Ac1 point. Specifically, it is about 780° C. or more. While the upper limit of the soaking temperature is not particularly limited, it is determined to be 900° C. in the light of preventing coarsening of austenite grains.

Similarly, holding time during soaking is not particularly limited, and for example, it can be about 10 sec or more.

After soaking, when the steel sheet is cooled to the normal temperature at an average cooling rate of 1° C./sec or more, a high strength steel sheet (cold-rolled steel sheet) can be obtained. In the average cooling rate of less than 1° C./sec, a pearlite structure is formed during cooling, which may be left as a final structure, causing deterioration in formability (elongation). The average cooling rate is preferably 5° C./sec or more. While the upper limit of the average cooling rate is not particularly specified, it is preferably about 50° C./sec in consideration of ease in control of steel sheet temperature, or facility cost.

To manufacture a high strength galvanized steel sheet being formed by forming a galvanizing layer on a surface of the high strength steel sheet, it is enough that the steel sheet is soaked at the above condition in a continuous galvanizing line, then cooled to plating bath temperature (400 to 500° C., preferably 440 to 470° C.) at an average cooling rate of 1° C./sec, and then subjected to galvanizing. In the average cooling rate of less than 1° C./sec, a pearlite structure is formed during cooling, which may be left as a final structure, causing deterioration in formability (elongation). The average cooling rate is preferably 5° C./sec or more. While the upper limit of the average cooling rate is not particularly specified, it is preferably about 50° C./sec in consideration of ease in control of steel sheet temperature, or facility cost.

A composition of the plating bath is not particularly limited, and a known galvanizing bath can be used. The Al content in the plating bath is preferably 0.05 to 0.2%. Al is an element that operates to control an alloying rate of a galvanizing layer. When a steel sheet is dipped into a galvanizing bath containing Al, a Fe—Al alloy layer is formed on a surface of the steel sheet (that is, an interface between the steel sheet and the galvanizing layer), consequently the steel sheet and zinc can be prevented from being immediately alloyed with each other. However, in the Al content of less than 0.05%, since the Fe—Al alloy layer is extremely thin, when the steel sheet is dipped in the plating bath, the steel sheet and zinc tend to be alloyed promptly. Consequently, a Γ phase largely grows before alloying proceeds to a plating surface and finishes in an alloying process, leading to reduction in powdering resistance (plating delamination resistance). The Al content is more preferably 0.07% or more. However, when the Al content exceeds 0.2%, since the Fe—Al alloy layer becomes excessively large in thickness, alloying between Fe and Zn is inhibited in the alloying process, resulting in delay in alloying of the galvanizing layer. Therefore, it is necessary that an alloying line is lengthened, or alloying at high temperature is separately performed in order to advance alloying. The Al content is more preferably 0.18% or less.

After galvanizing, the steel sheet is cooled to the normal temperature at an average cooling rate of 1° C./sec or more, thereby austenite in the steel sheet is transformed to martensite, and consequently a mixed structure mainly including ferrite and martensite can be obtained. In a cooling rate of less than 1° C./sec, martensite is hardly formed, and pearlite or the intermediately-transformed structure may be formed. The average cooling rate is preferably 10° C./sec or more.

To manufacture an alloyed, high strength galvanized steel sheet being formed by forming an alloyed galvanizing layer on a surface of the high strength steel sheet, it is enough that the steel sheet is subjected to galvanizing at the above condition, then heated to about 400 to 750° C. (preferably, about 500 to 600° C.) for alloying. In the case of performing alloying, a heating method is not particularly limited, and various kinds of usual methods (for example, gas heating and induction heater heating) can be utilized.

After alloying, the steel sheet is cooled to the normal temperature at an average cooling rate of 1° C./sec or more, thereby a mixed structure mainly including ferrite and martensite can be obtained.

To achieve an area ratio ($S_c$ value) of the intermediately-transformed structure in the second phase of a high strength steel sheet of 0.3 or less, in the case that the high strength steel sheet is a cold-rolled steel sheet, it is enough that when the steel sheet is cooled to the normal temperature after soaking, it is cooled such that time for passing through a temperature region of the steel sheet of 500° C. to 300° C. is 120 sec or less. Similarly in the case of the alloyed, galvanized steel sheet, it is enough that when the steel sheet is cooled to the normal temperature before and after alloying, it is cooled such that time for passing through a temperature region of the steel sheet of 500° C. to 300° C. is 120 sec or less. The time for passing through the temperature region is 120 sec or less, thereby formation of the intermediately-transformed structure can be suppressed.

EXAMPLES

Hereinafter, while the invention is described in a further detailed manner according to examples, the following examples are not intended to limit the invention, and the invention can be carried out with being appropriately modified within a range of satisfying the gist described before and later, and all of them are encompassed within the technical scope of the invention.

Steel having chemical component compositions as shown in Table 1 or 2 (the remainder includes Fe and inevitable impurities) was ingoted in a converter, and such steel ingot was subjected to continuous casting, thereby slabs were obtained. The obtained slabs were heated and held at 1250° C., and hot-rolled to a thickness of 2.4 mm with a reduction rate of about 99% with finishing temperature being of 900° C., then cooled at an average cooling rate of 50° C./sec, and then wound at 480° C., and consequently hot-rolled steel sheets were obtained. The obtained hot-rolled steel sheets were pickled, then cold-rolled to a thickness of 1.2 mm with a reduction rate of about 50%, and consequently cold-rolled steel sheets were obtained.

Ranges of the Si content were calculated using the formula (1) from the chemical compositions of steel sheets shown in Table 1 or 2. Results are shown in the following Table 1 or 2. Moreover, values of subtracting the α value from values of the Si content in steel (([Si]–α), provided, [Si] shows the Si content in steel) are collectively shown in the following Table 1 or 2.

The obtained cold-rolled steel sheets were subjected to the following treatment in an annealing line or a continuous galvanizing line, consequently soaked cold-rolled steel sheets, galvanized steel sheets, or alloyed, galvanized steel sheets were obtained.

Nos. 1 to 6 shown in the following Table 3 show the soaked cold-rolled steel sheets, in which the above cold-rolled steel sheets were heated to 830° C. in the annealing line, and held for 30 sec at the temperature for soaking, then cooled to the normal temperature at an average cooling rate of 15° C./sec.

Nos. 7 to 11 and No. 14 shown in the following Table 3 show the galvanized steel sheets, in which the above cold-rolled steel sheets were heated to 830° C. in a continuous galvanizing line, and held for 30 sec at the temperature for soaking, then cooled to a plating bath temperature at an average cooling rate of 15° C./sec, and then dipped in a plating bath for 3 sec to form galvanizing layers on surfaces of the cold-rolled steel sheets. As the plating bath, a galvanizing bath having Al content of 0.13% was used, and the plating bath temperature was 450 to 470° C. After plating, the steel sheets were cooled to the normal temperature at an average cooling rate of 10° C./sec.

Nos. 12 to 13 shown in the following Table 3 also show the galvanized steel sheets, in which galvanizing layers were formed on surfaces of the cold-rolled steel sheets at the same condition as in the No. 7, then the steel sheets were cooled at an average cooling rate of 30° C./sec in a temperature region from the plating bath temperature to 300° C., and cooled from 300° C. to the normal temperature at an average cooling rate of 10° C./sec.

Nos. 15 to 24 and Nos. 28 to 36 shown in the following Table 4 show the alloyed, galvanized steel sheets, in which galvanizing layers were formed on surfaces of the cold-rolled steel sheets at the same condition as in the No. 7, then heated to 540 to 560° C., and then held for about 10 sec at the temperature for alloying so that alloyed, galvanizing layers were formed on surfaces of the cold-rolled steel sheets. After alloying, the steel sheets were cooled to the normal temperature at an average cooling rate of 10° C./sec.

Nos. 25 to 27 shown in the following Table 4 also show the alloyed, galvanized steel sheets, in which galvanizing layers were formed at the same condition as in the No. 15, then the steel sheets were cooled at an average cooling rate of 30° C./sec in a temperature region from 500° C. to 300° C., and cooled from 300° C. to the normal temperature at an average cooling rate of 10° C./sec.

Next, for each of the obtained cold-rolled steel sheets after soaking, galvanized steel sheets, and alloyed, galvanized steel sheets, a metal structure in a central portion along thickness of a parent steel sheet was observed at a magnification of ×3000 using a scanning electron microscope (SEM), so that each area percent of ferrite and the second phase (intermediately-transformed structure and martensite) was measured. Measurement results are shown in the following Table 3 or 4. Moreover, an area ratio of the intermediately-transformed structure in the second phase ($S_c$ value) was calculated, and results are shown in Table 3 or 4.

Moreover, JIS 5 test pieces were cut out from the obtained cold-rolled steel sheets after soaking, galvanized steel sheets, and alloyed, galvanized steel sheets, and tensile tests were performed to measure tensile strength (TS) and elongation (El). Results are shown in the following Table 3 or 4. It was assumed that TS being within a range of not less than 590 MPa and less than 1270 MPa was acceptable, and TS being without the range was not acceptable.

TS×El was calculated to evaluate balance between strength and ductility. Results are shown in the following Tables 2 and 3. It was assumed that a steel sheet having elongation (El) of 20% or more was acceptable for a steel sheet having strength in a class of 590 MPa (not less than 590 MPa and less than 780 MPa), a steel sheet having elongation (El) of 28% or more was acceptable for a steel sheet having strength in a class of 780 MPa (not less than 780 MPa and less than 980 MPa), a steel sheet having elongation (El) of 15% or more was acceptable for a steel sheet having strength in a class of 980 MPa (not less than 980 MPa and less than 1180 MPa), and a steel sheet having elongation (El) of 9% or more was acceptable for a steel sheet having strength in a class of 1180 MPa (not less than 1180 MPa and less than 1270 MPa).

A relationship between the values of ([Si]–α) shown in Table 1 or 2 and TS×El shown in Table 3 or 4 is shown in FIG. 1. In FIG. 1, □ shows results of examples using steel types A1 to A20 (Nos. 1 to 5, Nos. 7 to 11 and Nos. 15 to 24), and ▲ shows results of examples using steel types C1 to C6 (No. 14 and Nos. 33 to 36). ■ shows results of examples of optimizing a cooling rate using steel types A9 to A10, A17, and A19 to A20, that is, examples of increasing the cooling rate such that the intermediately-transformed structure is not formed (Nos. 12 to 13 and Nos. 25 to 27).

For each of the obtained galvanized steel sheets and alloyed, galvanized steel sheets, presence of non-plating was visually observed to evaluate coatability. Results are shown in the following Tables 3 and 4.

TABLE 1

| Steel type | \multicolumn{15}{c}{Chemical composition (mass percent, the remainder: Fe and inevitable impurities} | Formula (1) | [Si] − α |
|---|---|---|---|---|---|---|---|---|---|---|---|---|---|---|---|---|---|---|
| | C | Si | Mn | P | S | Al | Cr | Mo | N | B | Ca | Cu | Ni | Ti | Nb | V | | |
| A1 | 0.061 | 0.65 | 1.65 | 0.010 | 0.002 | 0.05 | 0.25 | 0.01 | 0.005 | — | — | — | — | — | — | — | 0.20 to 1.90 | −3.65 |
| A2 | 0.057 | 0.85 | 1.52 | 0.014 | 0.002 | 0.06 | 0.33 | 0.03 | 0.006 | — | — | — | — | — | — | — | 0.17 to 1.87 | −3.42 |
| A3 | 0.089 | 0.91 | 1.83 | 0.012 | 0.002 | 0.05 | 0.13 | 0.23 | 0.006 | — | — | 0.004 | — | — | — | — | 0.67 to 2.37 | −3.86 |
| A4 | 0.085 | 1.51 | 2.21 | 0.019 | 0.001 | 0.04 | 0.04 | 0.05 | 0.006 | 0.0018 | — | — | — | — | — | — | 0.65 to 2.35 | −3.24 |
| A5 | 0.094 | 1.42 | 1.77 | 0.017 | 0.002 | 0.07 | 0.18 | 0.05 | 0.004 | — | — | 0.25 | 0.11 | 0.04 | — | — | 0.48 to 2.18 | −3.16 |
| A6 | 0.053 | 0.86 | 1.73 | 0.011 | 0.001 | 0.06 | 0.21 | 0.15 | 0.005 | — | — | 0.26 | 0.14 | — | — | — | 0.38 to 2.08 | −3.62 |
| A7 | 0.057 | 1.25 | 2.11 | 0.018 | 0.002 | 0.05 | 0.05 | 0.01 | 0.006 | — | — | — | — | — | — | — | 0.38 to 2.08 | −3.23 |
| A8 | 0.099 | 1.91 | 2.22 | 0.020 | 0.002 | 0.06 | 0.23 | 0.10 | 0.007 | — | — | — | — | — | — | — | 0.97 to 2.67 | −3.16 |
| A9 | 0.178 | 2.01 | 1.35 | 0.017 | 0.003 | 0.11 | 0.15 | 0.05 | 0.005 | — | — | — | — | — | — | — | 0.51 to 2.21 | −2.60 |
| A10 | 0.124 | 1.81 | 1.53 | 0.015 | 0.001 | 0.05 | 0.07 | 0.21 | 0.006 | 0.0025 | 0.003 | — | — | 0.07 | 0.03 | — | 0.54 to 2.24 | −2.83 |
| A11 | 0.042 | 1.04 | 2.02 | 0.021 | 0.002 | 0.10 | 0.31 | 0.07 | 0.005 | — | — | — | — | — | — | — | 0.57 to 2.27 | −3.63 |
| A12 | 0.069 | 1.47 | 1.86 | 0.018 | 0.002 | 0.05 | 0.18 | 0.02 | 0.004 | — | — | — | — | — | — | — | 0.37 to 2.07 | −3.00 |
| A13 | 0.096 | 1.25 | 2.12 | 0.014 | 0.001 | 0.14 | 0.23 | 0.01 | 0.003 | — | — | — | — | — | — | — | 0.77 to 2.47 | −3.62 |
| A14 | 0.065 | 1.74 | 1.78 | 0.011 | 0.001 | 0.06 | 0.21 | 0.35 | 0.006 | — | — | — | — | — | — | — | 0.74 to 2.44 | −3.10 |
| A15 | 0.082 | 2.36 | 2.54 | 0.017 | 0.003 | 0.08 | 0.03 | 0.14 | 0.004 | — | — | 0.31 | 0.14 | — | — | — | 1.00 to 2.70 | −2.74 |
| A16 | 0.093 | 1.86 | 2.26 | 0.013 | 0.001 | 0.08 | 0.21 | 0.31 | 0.005 | — | — | — | — | — | — | — | 1.20 to 2.90 | −3.44 |
| A17 | 0.075 | 1.64 | 2.02 | 0.012 | 0.002 | 0.07 | 0.02 | 0.04 | 0.005 | 0.0007 | 0.001 | 0.16 | 0.12 | — | — | — | 0.40 to 2.10 | −2.86 |
| A18 | 0.143 | 1.32 | 1.96 | 0.018 | 0.004 | 0.07 | 0.07 | 0.33 | 0.004 | — | 0.002 | — | — | 0.02 | — | — | 1.10 to 2.80 | −3.88 |
| A19 | 0.103 | 1.89 | 2.11 | 0.014 | 0.001 | 0.06 | 0.23 | 0.05 | 0.006 | 0.0018 | — | — | — | 0.05 | — | — | 0.86 to 2.56 | −3.07 |
| A20 | 0.082 | 1.61 | 2.56 | 0.022 | 0.002 | 0.07 | 0.21 | 0.45 | 0.005 | — | — | — | — | 0.08 | — | 0.05 | 1.56 to 3.26 | −4.05 |

TABLE 2

| Steel type | \multicolumn{15}{c}{Chemical composition (mass percent, the remainder: Fe and inevitable impurities} | Formula (1) | [Si] − α |
|---|---|---|---|---|---|---|---|---|---|---|---|---|---|---|---|---|---|---|
| | C | Si | Mn | P | S | Al | Cr | Mo | N | B | Ca | Cu | Ni | Ti | Nb | V | | |
| B1 | 0.020 | 0.85 | 2.76 | 0.021 | 0.001 | 0.09 | 0.27 | 0.30 | 0.005 | — | — | 0.18 | — | — | — | — | — | — |
| B2 | 0.067 | 3.24 | 1.84 | 0.015 | 0.002 | 0.06 | 0.11 | 0.14 | 0.007 | — | — | — | — | — | — | — | — | — |
| B3 | 0.127 | 1.54 | 0.04 | 0.015 | 0.002 | 0.06 | 0.35 | 0.32 | 0.007 | — | 0.001 | — | — | — | — | — | — | — |
| B4 | 0.081 | 0.53 | 3.24 | 0.015 | 0.005 | 0.05 | 0.36 | 0.15 | 0.004 | 0.0013 | — | — | 0.31 | — | — | — | — | — |
| B5 | 0.102 | 0.88 | 2.07 | 0.015 | 0.005 | 0.05 | 0.16 | 0.21 | 0.006 | — | — | 0.15 | — | 0.21 | 0.05 | — | — | — |
| C1 | 0.088 | 0.42 | 2.14 | 0.011 | 0.001 | 0.05 | 0.18 | 0.18 | 0.005 | — | — | — | — | — | — | — | 0.90 to 2.60 | −4.58 |
| C2 | 0.062 | 2.43 | 1.83 | 0.018 | 0.002 | 0.03 | 0.08 | 0.20 | 0.004 | — | 0.002 | — | — | — | — | — | 0.44 to 2.14 | −2.11 |
| C3 | 0.095 | 0.02 | 2.23 | 0.015 | 0.001 | 0.07 | 0.21 | 0.30 | 0.006 | — | — | — | — | — | — | — | 1.17 to 2.87 | −5.25 |
| C4 | 0.096 | 0.59 | 2.30 | 0.018 | 0.004 | 0.08 | 0.22 | 0.31 | 0.005 | — | — | — | — | — | — | — | 1.25 to 2.95 | −4.76 |
| C5 | 0.092 | 1.06 | 2.91 | 0.021 | 0.002 | 0.11 | 0.26 | 0.03 | 0.005 | — | 0.002 | — | — | — | — | — | 1.40 to 3.10 | −4.44 |
| C6 | 0.155 | 0.51 | 1.42 | 0.013 | 0.001 | 0.10 | 0.17 | 0.23 | 0.006 | 0.0008 | — | 0.22 | 0.15 | — | — | — | 0.70 to 2.40 | −4.29 |

TABLE 3

| | | Metal structure | | | Properties | | | | |
|---|---|---|---|---|---|---|---|---|---|
| | | Ferrite | | Intermediate transformation | | | | | |
| No. | Steel type | (area percent) | Second phase (area percent) | structure (area percent) | Sc value | TS (MPa) | El (%) | TS × El (MPa %) | non-plating | Remarks |
| 1 | A1 | 83 | 17 | 1.4 | 0.08 | 632 | 30.2 | 19086 | — | Cold-rolled steel sheet |
| 2 | A2 | 78 | 22 | 2.2 | 0.10 | 647 | 29.8 | 19248 | — | Cold-rolled steel sheet |
| 3 | A3 | 55 | 45 | 6.3 | 0.14 | 840 | 21.7 | 18245 | — | Cold-rolled steel sheet |
| 4 | A4 | 35 | 65 | 9.8 | 0.15 | 1028 | 18.2 | 18721 | — | Cold-rolled steel sheet |
| 5 | A5 | 38 | 62 | 6.8 | 0.11 | 996 | 18.6 | 18516 | — | Cold-rolled steel sheet |
| 6 | C1 | 68 | 32 | 12.5 | 0.39 | 858 | 15.1 | 12973 | — | Cold-rolled steel sheet |
| 7 | A6 | 76 | 24 | 2.9 | 0.12 | 628 | 30.5 | 19154 | not present | Galvanized steel sheet |
| 8 | A7 | 58 | 42 | 9.7 | 0.23 | 625 | 30.4 | 18988 | not present | Galvanized steel sheet |
| 9 | A8 | 29 | 71 | 20.6 | 0.29 | 1075 | 17.2 | 18436 | not present | Galvanized steel sheet |
| 10 | A9 | 13 | 87 | 30.5 | 0.35 | 1227 | 14.0 | 17110 | not present | Galvanized steel sheet |
| 11 | A10 | 38 | 62 | 22.3 | 0.36 | 1054 | 17.3 | 18247 | not present | Galvanized steel sheet |
| 12 | A9 | 13 | 87 | 24.4 | 0.28 | 1237 | 14.5 | 17867 | not present | Galvanized steel sheet |
| 13 | A10 | 38 | 62 | 17.4 | 0.28 | 1084 | 17.6 | 19091 | not present | Galvanized steel sheet |
| 14 | C2 | 51 | 49 | 9.3 | 0.19 | 954 | 15.1 | 14396 | not present | Galvanized steel sheet |

TABLE 4

| | | Metal structure | | | Properties | | | | |
|---|---|---|---|---|---|---|---|---|---|
| | | Ferrite | | Intermediate transformation | | | | | |
| No. | Steel type | (area percent) | Second phase (area percent) | structure (area percent) | Sc value | TS (MPa) | EI (%) | TS × EI (MPa %) | non-plating | Remarks |
| 15 | A11 | 74 | 26 | 6.2 | 0.24 | 643 | 30.8 | 19763 | not present | Alloyed, galvanized steel sheet |
| 16 | A12 | 62 | 38 | 8.4 | 0.22 | 634 | 30.3 | 19176 | not present | Alloyed, galvanized steel sheet |
| 17 | A13 | 58 | 42 | 10.9 | 0.26 | 833 | 22.4 | 18631 | not present | Alloyed, galvanized steel sheet |
| 18 | A14 | 51 | 49 | 10.3 | 0.21 | 817 | 22.0 | 17982 | not present | Alloyed, galvanized steel sheet |
| 19 | A15 | 18 | 82 | 13.9 | 0.17 | 1226 | 13.9 | 17034 | not present | Alloyed, galvanized steel sheet |
| 20 | A16 | 43 | 57 | 13.1 | 0.23 | 1055 | 18.0 | 18937 | not present | Alloyed, galvanized steel sheet |
| 21 | A17 | 32 | 68 | 24.5 | 0.36 | 989 | 18.0 | 17803 | not present | Alloyed, galvanized steel sheet |
| 22 | A18 | 25 | 75 | 18.0 | 0.24 | 1049 | 16.8 | 17613 | not present | Alloyed, galvanized steel sheet |
| 23 | A19 | 31 | 69 | 24.2 | 0.35 | 1064 | 17.2 | 18311 | not present | Alloyed, galvanized steel sheet |
| 24 | A20 | 21 | 79 | 29.2 | 0.37 | 1212 | 14.1 | 17058 | not present | Alloyed, galvanized steel sheet |
| 25 | A17 | 32 | 68 | 14.3 | 0.21 | 1014 | 18.7 | 18963 | not present | Alloyed, galvanized steel sheet |
| 26 | A19 | 31 | 69 | 15.9 | 0.23 | 1096 | 18.0 | 19739 | not present | Alloyed, galvanized steel sheet |
| 27 | A20 | 21 | 79 | 21.3 | 0.27 | 1212 | 14.8 | 17906 | not present | Alloyed, galvanized steel sheet |
| 28 | B1 | 81 | 19 | 2.9 | 0.15 | 512 | 26.4 | 13493 | not present | Alloyed, galvanized steel sheet |
| 29 | B2 | 92 | 8 | 0.4 | 0.05 | 565 | 22.7 | 12831 | present | Alloyed, galvanized steel sheet |
| 30 | B3 | 64 | 36 | 29.9 | 0.83 | 597 | 25.2 | 15067 | not present | Alloyed, galvanized steel sheet |
| 31 | B4 | 28 | 72 | 13.7 | 0.19 | 1041 | 8.5 | 8834 | not present | Alloyed, galvanized steel sheet |
| 32 | B5 | 34 | 66 | 15.8 | 0.24 | 1074 | 8.4 | 9011 | not present | Alloyed, galvanized steel sheet |
| 33 | C3 | 32 | 68 | 28.6 | 0.42 | 964 | 10.4 | 10064 | not present | Alloyed, galvanized steel sheet |
| 34 | C4 | 20 | 80 | 26.4 | 0.33 | 1005 | 13.1 | 13125 | not present | Alloyed, galvanized steel sheet |
| 35 | C5 | 24 | 76 | 31.9 | 0.42 | 1092 | 12.7 | 13814 | not present | Alloyed, galvanized steel sheet |
| 36 | C6 | 46 | 54 | 11.9 | 0.22 | 999 | 13.8 | 13736 | not present | Alloyed, galvanized steel sheet |

As obvious from Tables 1 to 4, it is known that any of the steel sheets are configured by the mixed structure of ferrite and the second phase. In particular, No. 20 (steel type A16) and No. 34 (steel type C4) in Table 4 are examples where chemical compositions of them are approximately the same except for Si, and when they are compared to each other, while No. 34 has a high fraction of the intermediately-transformed structure in the second phase because the Si content is low, No. 20 has a low fraction of the intermediately-transformed structure in the second phase because the Si content is high. Therefore, while they are in approximately the same level of strength, they are different in elongation, and No. 20 is more excellent in mechanical properties (balance between strength and elongation).

On the other hand, Nos. 28 to 32 in Table 4 are examples where chemical compositions are out of the range specified by an embodiment of the invention, wherein balance between strength and ductility is bad. In particular, No. 28 (steel type B1), which is an example of low C content, can not ensure sufficient strength. No. 29 (steel type B2), which is an example of high Si content, does not exhibit sufficient strength because of an excessively high fraction of ferrite. In addition, Si scales are produced on a surface of the steel sheet and thus surface properties are deteriorated, resulting in deterioration in coatability. No. 30 (steel type B3), which is an example of low Mn content, is low in strength because of decreased quantity of dissolved Mn. In addition, elongation (El) is reduced since part of the second phase is formed as the intermediately-transformed structure. No. 31 (steel type B4) which is an example of high Mn content, is high in strength, but low in elongation. No. 32 (steel type B5), which is an example of high Ti content, is sufficient in strength, but significantly reduced in local elongation since large quantity of carbides are precipitated in grain boundaries.

As obvious from FIG. 1, it is known that when balance between the Si content in steel and content of alloy elements influencing the second phase is appropriately controlled, mechanical properties (balance between strength and elongation) of a steel sheet can be improved. In particular, referring to results of Nos. 12 to 13 shown in Table 3 and Nos. 25 to 27 shown in Table 4 (■ in FIG. 1), it is known that the fraction of the intermediately-transformed structure in the second phase is decreased, thereby elongation is particularly increased, and consequently the mechanical properties (balance between strength and elongation) of a steel sheet can be remarkably improved.

On the other hand, when balance between the Si content in steel and content of alloy elements influencing the second phase is bad, and the values of ([Si]−α) are out of the range of −4.1 to −2.4, balance between strength and ductility is degraded. For example, No. 20 (steel type A16), No. 33 (steel type C3), and No. 34 (steel type C4) are examples where chemical compositions are approximately the same except for Si, wherein mechanical properties (balance between strength and elongation) are increased in values with increase in Si content, and No. 20, of which the Si content is appropriately controlled, exhibits extremely excellent balance between strength and elongation.

What is claimed is:

1. A high strength steel sheet comprising, in percent by mass:
C: 0.03 to 0.2%;
Si: 0.6 to 2.5%;
Mn: 1 to 3.0%;
Cr: 0.01 to 0.5%;
Mo: 0.01 to 0.5%;
Al: 0.02 to 0.15%;
Ti: 0.15% or less;
Nb: 0.15% or less; and
V: 0.15% or less,
wherein
a metal structure of the steel sheet includes a mixed structure of ferrite and a second phase, a fraction of ferrite is 10% to 80%, and a fraction of the second phase is 20% to 90%;
the content of Si satisfies formula (1), $$\alpha - 4.1 \leq [Si] \leq \alpha - 2.4 \qquad (1),$$

provided, $\alpha=6.9\times([C]+[Mn]/6+[Cr]/5+[Mo]/4+[Ti]/15+[Nb]/17+[V]/14)^{1/2}$ is given, wherein [ ] shows the quantity (mass percent) of each element contained in the steel sheet;

an area ratio ($S_c$) of an intermediate transformation structure in the second phase is 0.3 or less; and the steel sheet satisfies TS×El is 17000 MPa % or more, wherein TS represents tensile strength of the steel sheet in MPa and El represents elongation percentage of the steel sheet in %.

2. The high strength steel sheet according to claim 1, wherein the steel sheet comprises at least one element selected from the group consisting of Ti: 0.01 to 0.15%, Nb: 0.01 to 0.15%, and V: 0.01 to 0.15%.

3. The high strength steel sheet according to claim 1, wherein the steel sheet further comprises B: 0.0005 to 0.01%.

4. The high strength steel sheet according to claim 1, wherein the steel sheet further comprises Ca: 0.0005 to 0.01%.

5. The high strength steel sheet according to claim 1, wherein the steel sheet further comprises at least one of Cu: 0.0005 to 0.5% and Ni: 0.0005 to 0.5%.

6. The high strength steel sheet according to claim 1, wherein a surface of the high strength steel sheet has a galvanizing layer formed thereon.

7. The high strength steel sheet according to claim 1, wherein a surface of the high strength steel sheet has an alloyed galvanizing layer formed thereon.

8. The high strength steel sheet according to claim 1, wherein TS is from 590 to 1270 MPa.

* * * * *